Figure 1:
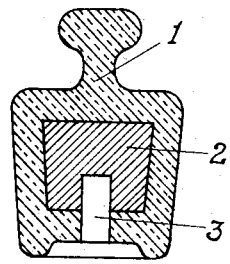

Sept. 20, 1932.  W. O. SNELLING  1,878,009

BALANCE WEIGHT

Filed Oct. 29, 1928

Walter O. Snelling
INVENTOR

Patented Sept. 20, 1932

1,878,009

UNITED STATES PATENT OFFICE

WALTER O. SNELLING, OF ALLENTOWN, PENNSYLVANIA

BALANCE WEIGHT

Application filed October 29, 1928. Serial No. 315,833.

My invention relates to improvements in standards of mass such as are employed in weighing operations, and more particularly my invention relates to improved balance weights of the type commonly used by chemists and physicists in weighing operations in which a high degree of accuracy or precision is required. One object of my invention is to provide means by which balance weights of permanent nature and of an exceptionally high degree of accuracy may be manufactured at a relatively low cost as compared with manufacture by methods at present known.

In order to satisfactorily fulfill the normal functions of a standard of mass or weight, a balance weight must be capable of being calibrated to a high degree of equivalency with an ultimate standard of mass or weight, and after being so calibrated must remain constant, without either further loss or gain of weight within the limits of accuracy that are required.

Although it is possible by methods now known to prepare weights for the coarser operations of weighing which are entirely satisfactory for practical purposes, it has been found very difficult to prepare weights that are entirely satisfactory for the more refined operations of precision weighing. Of all of the metals at present available for the manufacture of weights, platinum has been found to possess the most satisfactory resistance to oxidation, and has accordingly been employed in the preparation of balance weights where the highest degree of accuracy is required, but as the cost of platinum has been for many years greater than the cost of an equal weight of pure gold, the use of platinum for the heavier weights of commercial sets has been impracticable for economic reasons.

As a result of the high cost of platinum, making its use impracticable in the construction of the sets of balance weights ordinarily used by chemists and physicists in their everyday work, platinum has been used as the material of construction for "ultimate" or national standard of weight or mass, while brass weights have been employed and are generally used in most ordinary work.

This almost universal use of brass as the material of construction of commercial units of weight or mass has lead to an anomalous situation with respect to correction for buoyancy. Although a brass kilogram weight will exactly balance a platinum kilogram weight when the two weights are compared in an absolute vacuum, the two weights will not exactly balance each other when weighed in air. Since every substance present within a fluid is buoyed up by a weight corresponding to the weight of a volume of the fluid which it displaces, it will be evident that a brass weight of any given volume when weighed in air will be buoyed up to the extent of the weight of the volume of air which the weight displaces, and similarly a platinum weight when weighed in air will be buoyed up to the extent of the weight of the volume of air which it displaces. The volume of a kilogram of platinum is less than half the volume of a kilogram of brass, and accordingly two kilograms weights, one made of brass and one made of platinum, will have quite different volumes, and although each of the two weights will possess exactly the same number of units of mass, and will accordingly balance one another when weighed in a vacuum, their apparent weight, when weighed in air, will be quite different.

Because of the adoption of platinum as the material of construction of the ultimate standards of weight and because of the unfortunate difference between the specific gravity of platinum, and the specific gravity of brass, which latter material has by common usage become the material of construction of precision units of mass for commercial purposes, it is customary to apply a buoyancy or vacuum correction to all weights that are used in precision weighings as referred to the platinum ultimate standard, and a corresponding correction would have to be made if weights of any material having a lower or a higher specific gravity than that of brass were to be used in precision weighings that would be compared with weighings made with brass weights.

Although brass tarnishes relatively slowly, when exposed to atmospheric conditions, it is well recognized to slowly oxidize, with very apparent darkening of the surface, and with an increase in weight which is entirely too high to be disregarded in precision weighings. Recent work (Proc. Phys. Soc., London, Apr. 15, 1928, Ab. Jour. Franklin Inst., vol. 206, No. 4, Oct. 1928, p. 564) has afforded quantative figures for the corrodibility of brass when exposed to atmospheric agencies for even short periods of time, but it has long been recognized that brass weights slowly undergo superficial changes with alteration of weight of sufficient importance to decidedly influence weighings of precise character. Accordingly, brass weights for precision weighing are usually covered with a superficial coating of lacquer or a plating of gold or platinum for the purpose of reducing atmospheric deterioration, and weights of this general character have now, by long usage, been accepted as a secondary standard in all precision weighing operations. Correction for buoyancy is only made in work where the very highest accuracy is required, the general assumption being that even in precision operations the weight as stated is the apparent weight in air of the object weighed as balanced against balance weights having an average specific gravity of 8.4, which is the average specific gravity of brass.

In this specification I will distinguish between major weights and minor weights, major weights referring to weights heavier than 1 or 2 grams, in the case of metric weights, and weights heavier than 1 dram, in avoirdupois weights, and weights heavier than 1 scruple, in apothecaries weights. Metric weights smaller than 1 gram, and avoirdupois weights smaller than 1 dram, and apothecaries weights smaller than 1 scruple, will be considered as minor weights, and in the case of minor weights the vacuum or buoyancy correction is so small that it may usually be disregarded, even in connection with weighings of high precision.

My present invention is directed mainly to major weights having a mass of 1 gram or more, and the principal object of my invention is to provide means by which major balance weights possessing the permanent accuracy and nontarnishing characteristics of platinum may be commercially prepared in quantity with a minimum of variation between the individual units, and by production methods particularly adapted to large scale manufacture at low cost, while maintaining an exceptionally high standard of accuracy.

I have discovered that plastics such as the well known thermoplastic condensation products of phenol, urea, phthalic acid, etc., with aldehydes, alcohols, sulfur chloride, etc., form exceptionally desirable materials of construction for precision balance weights, and that by properly proportioning a case or casing of a chemically inert material around a base or core of a material of high specific gravity it is possible to prepare balance weights which may be used with brass weights, or may be used to replace brass weights, without involving any buoyancy or vacuum corrections whatever, as compared with weighings made with the usual brass weights forming the present secondary standard. In the case of small weights, I may form, mold, or fashion a suitable plastic to directly produce the desired weight, the limiting size of weight which can be used without an inner core being determined by the degree of precision required in the finished weight, while in the case of larger weights, I form, mold, or fashion an outer casing of such volume and of such weight, by methods that will be hereinafter described, that such case will, when used in conjunction with an inner core of high specific gravity, have exactly the density or specific gravity of brass, while possessing resistance superior to that of brass upon exposure to atmospheric agencies or laboratory fumes.

In recent years there have been developed a large number of plastics having characteristics similar to bakelite, a well known phenolic condensation product, these plastics being made from a variety of materials and being known by many individual trade names such as aceloid, acelose, albertol, axolith, bakelite, bernite, celeron, colasta, condensite, durez, durite, dorex, pollopas, etc. In the absence of any well recognized class designation for these bodies I will employ in this specification the embracive term "synres" to represent a synthetic plastic resin or equivalent tough, chemically reactive reaction product or condensation product of the types above named, including under this term synres not only the solid chemically inert products of phenol with formaldehyde, but also related condensation products of other phenols, cresols, etc. with formaldehyde and other aldehydes, as well as like chemically inert and non-reactive bodies formed from urea, casein, phthalic acid, glycerol and many similar raw materials, the essential requirements of the material used for the outer portion of the present improved weights being not the chemical constitution but rather such chemical and physical characteristics as inertness to oxygen, moisture, carbon dioxide and like atmospheric agencies, and suitable hardness and toughness. In one form of my invention I employ glass as the material of construction of the improved balance weights herein described, a tough boro-silicate glass of low coefficient of thermal expansion being used to surround a core of metallic lead, tungsten, uranium or like material of very high specific gravity, to form a weight having the same apparent specific gravity as the specific gravity of brass weights used as the present secondary standard, the inner core being preferably hermetically sealed within the outer glass case by autogenous closure, so as to be fully protected from the action of the atmosphere. By suitable proportioning of the volume and weight of the inner core and of the outer case, by methods that will now be described, it is possible to obtain standards of weight of enduring life and of unalterable nature, and having the exact density of brass weights, so as to involve no vacuum or buoyancy correction when used in highly precise weighing operations against brass weights of the present approved type.

Figure 2:
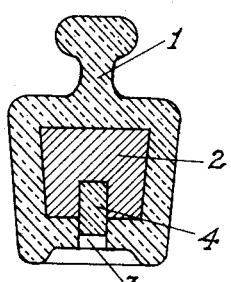
Figure 3:
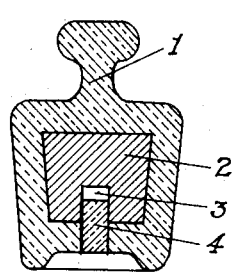
Figure 4:
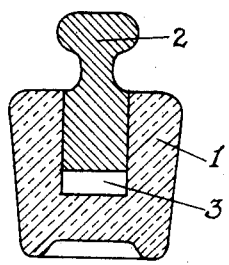
Figure 5:
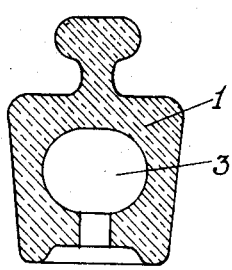
Figure 6:
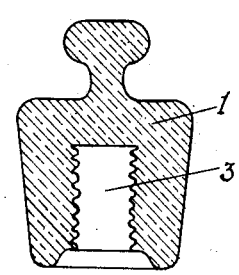
Figure 7:
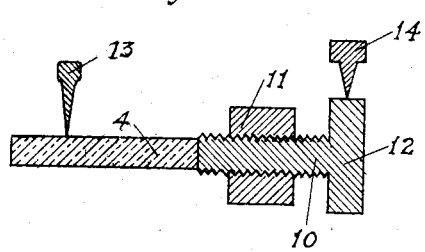

In the drawing forming part of this application Figure 1 is a cross sectional view through one form of balance weight made in accordance with my present invention. Figures 2, 3 and 4 are cross sectional views through slightly modified forms of balance weights made in accordance with my present invention. Figures 5 and 6 are cross sectional views through other forms of outer cases or bodies of balance weights made in accordance with my present invention. Figure 7 is a schematic cross sectional view of apparatus particularly adapted to the calibration of weights made in accordance with my present invention.

In the preferred form of my present invention I first form a mass or core of a material of high specific gravity such as silver (sp. g. 10.5), lead (sp. g. 11.3), tantalum (sp. g. 16.6), uranium (sp. g. 18.7), tungsten (sp. g. 18.8), gold (sp. g. 19.3), platinum (sp. g. 21.2) or osmium (sp. g. 22.5), and I then encase this mass or core in an outer case or body of a chemically-inert material of low specific gravity such as glass, bakelite or pollopas, or equivalent hard, tough and chemically-resistant material, the relative volumes and weights of the material of high specific gravity forming the core and the material of low specific gravity forming the case being such that the specific gravity of the completed weight corresponds with the specific gravity of the standard of weight to be used in comparison.

As an example of the method of calculation employed in determining the relative size of the case and of the core, I will consider a composite weight having a core of tungsten and a case of bakelite, the weight to be of the 100 gram size commonly used in sets of weights ranging from 1 kilogram to 1 gram. As the specific gravity of the kind of brass used in the manufacture of weights is 8.4, and as this figure has been accepted by the Bureau of Standards of the Department of Commerce of the U. S. Government as the commercial standard for the specific gravity of weights of high precision, it will be evident that the total volume of my new composite weight can be found by dividing 100 by 8.4, and by making this calculation it will be found that in order that a 100 gram weight may have a specific gravity of 8.4, its over-all volume must be 11.905 c. c. If $x$ be taken as the volume of the bakelite used in forming the case, and if $y$ be taken as the volume of the tungsten used in forming the core, then it will be evident that $$x + y = 11.905$$

while assuming a specific gravity for bakelite of 1.25 and a specific gravity for tungsten of 18.77, it will also be evident that $$1.25x + 18.77y = 100.000$$

since the volume of the bakelite when multiplied by its specific gravity when added to the volume of the tungsten when multiplied by its specific gravity, must represent all of the mass that is present in the weight, and accordingly must total the 100 grams of the final weight.

Solving the above equations it will be found that in the present case $x$ equals 7.046 c. c. and that $y$ equals 4.859 c. c. and that accordingly if a tungsten core having a volume of 4.859 c. c. is combined with a bakelite case having a volume of 7.046 c. c., the resulting weight will have a mass of exactly 100 grams, and will have a volume exactly the same as it would have if made of solid brass of the type normally used in the manufacture of brass weights. Final calibration to the exact desired weight is performed upon the substantially finished weight, by known means.

By a method similar to that above indicated, the proper volume of the case and the proper volume of the core can be found for a weight of any size desired, and so proportioned that it will involve no buoyancy correction when used in conjunction with brass weights, or more broadly, by employing any other standard of specific gravity than 8.4, no buoyancy correction is involved when such weight is used in conjunction with weights of any other material of construction accepted as a standard of comparison.

In the preferred form of my invention I employ a hard, tough, chemically inert material of a specific gravity lower than 5 as the material of construction of my case, and I employ a heavy metal or alloy or a solid chemical compound having a specific gravity of 9 or more as the material of construction of my core. I preferably first form the core, from a heavy metal or alloy by a casting or molding operation or by turning from a bar or rod of the material, or from a chemical compound by a tableting or compressing operation of suitable nature, and I find it convenient in forming the core of weights made in accordance with the present invention, to provide a small well, pit or indentation in such core, this well or opening serving to hold the core in desired position, by means of an inserted pin or other support, in the subsequent encasing operation.

Having prepared a core of suitable volume and weight from a material having a sp. g. of 9 or more, by the methods above described or by equivalent methods, I next surround or encase this core in a jacket of a chemically inert synres or equivalent protecting agent, preferably employing the well known methods of hot pressure molding as commonly employed in the forming of objects from bakelite and other thermo-plastic solids. In the encasing operation I may wholly surround and hermetically seal the inner core of high specific gravity, but I prefer to leave an opening or well extending through the encasing synres or equivalent protecting agent, the final operations of calibrating the weight being performed through this opening, and the opening being subsequently closed by a pin or plug, forcibly driven, screwed, cemented, or otherwise suitably held in place upon the completion of the calibrating operation.

Since the plug or pin used as the final closure has weight, it will be evident that in calibrating weights made in accordance with the present invention through a well or opening to be subsequently closed by a plug, the plug must be considered as a part of the weight, and must be weighed with the weight, in the calibrating operations. In the preferred form of my invention I employ the plug used as the closure of the weight as the material that is altered in the calibrating operation, intentionally employing a plug or pin of slightly greater weight than is necessary to bring the combined weight of the weight body and the pin to the desired final weight, and subsequently reducing the weight of the pin by cutting or grinding or by other suitable means, until the exact weight desired is reached. By employing a pin of uniform cross sectional area and preferably of cylindrical shape it is possible, by careful determination of the weight of such pin per unit of length, to cut off a given length of the pin that will closely correspond to the calibrating weight desired, and I find such measuring of the length of the closure pin, and the cutting off of such closure pin to a desired length by known micrometric methods, to form an exceptionally convenient, simple and desirable method of calibrating weights.

Metals suitable for the forming of the core for weights made in accordance with the present invention are bismuth, gold, iridium, lead, mercury, molybdenum, osmium, paladium, platinum, rhodium, rethenium, silver, tantalum, phallium, thorium, tungsten and uranium. It will be noted that some of the above metals are not strongly resistant to atmospheric agencies, and are wholly unsuitable for use in the manufacture of weights of the type now in common use, but may be employed as core material in conjunction with the present invention because of the fact that the core material may be wholly protected from the atmosphere by the outer case of synres or equivalent chemically-inert material. In the present composite weight, the function of the core is solely to give the necessary high mass to the finished weight, and the function of the case is solely to resist atmospheric agency and mechanical wear, and thus supply the required unalterability to the finished weight. By the present invention two materials, either of which alone would be unsuitable for use as a material of construction for weights may be employed in conjunction with complete success, a heavy protected core giving the desired density and the proper specific gravity to a case made of a very light but chemically resistant material, so as to form a composite weight having the same specific gravity as brass, and possessing much greater resistance to atmospheric and chemical agencies than brass.

Instead of employing a single metal to form a core, I may of course employ a plurality of metals, either separately or alloyed with each other, any alloy having a specific gravity in excess of 9 being suitable. Instead of employing a metal or alloy to form the core, I may employ a chemical compound such as silver antimonide or any oxide, bromide or iodide having a specific gravity of 9 or more. Although some alloys, and particularly the naturally-occurring alloy of iridium and osmium known as iridosmine may be employed as a core material, and although a few chemical compounds of high specific gravity are also suitable, in general I prefer to employ heavy metals such as lead, tungsten and uranium in the forming of the cores used in the composite weights herein described, as I find that these metals fully answer the exacting requirements of core bodies for composite weights of the preferred type.

In Figure 1, 1 is the case of the weight and 2 is the core of the weight. Calibration of the weight is most conveniently effected through an opening 3, which is preferably in the bottom of the weight, by any of the well known methods of drilling or filling.

In Figure 2, 1 is the case of the weight and 2 is the core of the weight. 4 is a plug, fitting tightly in a hole 3, which hole is preferably in the bottom of the weight. In Figure 3, 1 is the case of the weight, 2 is the core of the weight, 3 is an unfilled portion of the calibrating hole and 4 is a plug, driven into the weight until flush with a part of the bottom surface of the weight. Upon comparing Figure 2 and Figure 3 it will be noted that in Figure 2 the plug 4 has been forced into the weight until its top is in contact with the top of hole 3, while in Figure 3 the plug 4 has been forced into the weight until its bottom is in line with the bottom of the hole 3. As the weights and volumes of the body portion of the two weights, the core portion of the weights and the plugs of the two weights may be exactly the same in the two cases, and are so represented in the drawing, it will be obvious that by the positioning of the plug 4 the effective or "over-all" volume of composite weight made in accordance with the present invention may be controlled without changing the total mass of the weight. Thus, in calibrating a weight made in accordance with the present invention, the body of the weight and the core of the weight may first be made slightly lighter in weight and slightly lower in volume than is desired in the final weight. A plug of suitable diameter to fit tightly in the opening or well of the weight is next fashioned, and is cut off to such length that its weight, when added to the weight of the case and the core, will exactly equal the final desired weight of the finished unit of mass. Although the mass of the three component parts of the finished weight have now been accurately determined, the effective or over-all volume of the weight may still be modified without any corresponding change in the weight, and therefore final calibration of the volume or specific gravity of the weight, as distinguished from the actual mass or weight of the weight, may now be effected by driving the plug into the well or cavity of the weight, to any desired extent. The plug may be driven completely into the weight, so that its top is in contact with the far end of the hole or well, as shown in Figure 2, or the plug may be driven into the weight only until the bottom of the plug is contiguous or flush with a portion of the bottom of the weight. For intermediate volume calibration the plug may be driven into the weight into any position intermediate between that shown in Figures 2 and 3, or if desired the plug may be driven only partially into the hole or well, leaving a portion of the plug exposed outside of the hole, and thus still further modifying the degree of volume control which can be made effective in calibration operations as described.

By the present invention a weight can be made of any desired specific gravity, from two or more materials neither of which possesses such specific gravity as would permit a weight of such material to be employed in conjunction with brass weights without volume or buoyoncy correction, and in addition by the present invention a weight can be calibrated to conform exactly with the weight of any desired standard of mass, and can thereafter, without any change in the mass of the weight, be further calibrated so as to exactly correspond in effective volume or specific gravity to a standard of mass or weight. By effective volume is meant the total volume of the weight effective in controlling the density or apparent specific gravity of the weight when considered as a whole, and independent of the volume of any inner cavity or opening that may be sealed off from communication with the atmosphere surrounding the weight.

In Figure 4, 1 is the case of the weight, and 2 is the core of the weight, the core in this case being partly outside of the case of the weight, so as to form a stem for the weight, 3 is a well or cavity in the weight, for purposes of calibration as described. It will be obvious that in the construction of weights in accordance with Figure 3, the core should be made of a material which is highly resistant to atmospheric agencies, tungsten being particularly suitable for the manufacture of weights of this general character.

In Figures 5 and 6, 1 is the case or body of the weight, and 3 is an opening to receive a core of suitable heavy material. In Figure 5 the opening 3 is bottle-shaped, to receive a core material in molten, plastic or fluid condition. In Figure 6 the opening is provided with serrated walls, for the purpose of retaining without motion a subsequently introduced core material and a subsequently inserted sealing means or material.

Figure 7 is a schematic sectional view of apparatus which I have found useful in the calibration of weights made in accordance with my present invention. In this figure, 4 is a cross sectional view of a pin of uniform cross sectional area, to be used in closing the well or cavity of a weight such as shown in Figure 1. 10 is a threaded screw member, movable within a fixed support 11, the threaded screw member 10 being provided with a suitable movable head 12. 13 is a knife or cutting member, movable vertically, but its plane of movement being fixed with reference to the supporting member 11. 14 is an indicating arrow or device of any suitable nature, for enabling the degree of motion or rotation of the head 12 and the threaded screw member 10 to be measured or determined.

In the calibration of weights by the use of the device shown in Figure 7, the pin member 4 is first accurately weighed, and its weight per unit of length is then determined. The required weight necessary for the calibration of the composite weight is next determined by a weighing operation, and the head 12 is then turned until the motion of the knife 13 will cut off the exact length of the pin member 4 which is necessary to complete the calibration of the weight. By the means described, the calibration of a weight can be effected with a much higher degree of accuracy than is possible by the methods at present commonly used, and by employing a pin member of a material of low specific gravity, such as bakelite or any other synres, for example, the calibration of weights can be performed with rapidity and exactness, in all cases the weight per unit of length of a pin of uniform cross sectional area and of low specific gravity, and preferably of cylindrical cross section in a direction at right angle to its length, being first determined, and the final calibration of the weight being brought about by the cutting off of a length of the pin corresponding to the desired weight necessary, when added to the weight of the case and core, to make the final desired total weight of the finished composite weight. By the use of micrometer control of the cutting knife, so that the length of pin cut off can be very exactly measured, the final calibration of a weight can be effected with a great saving of time as compared with methods of calibration now commonly used.

Although I prefer to employ a pin of cylindrical from as the means for the final calibration of the composite weight made in accordance with the present invention, the use of such a pin does not form a necessary part of the present invention, and any other suitable means of calibration may be employed, such as the well known methods of drilling and filling. I may employ a conical pin instead of a cylindrical pin, and I preferably employ as a pin or means of closure an object very slightly larger in diameter than the size of the hole or well, so that upon forcing such closing means to its desired final position by means of pressure, the pin or other closing means will be held elastically in place by the resulting compression of the pin and the corresponding expansion of the walls of the well or opening. When employing glass, or other material fusible by heat in forming the case of a composite weight, I prefer to employ as a means of closure a pin of fusible glass, heat being then applied to the exposed bottom of the pin and adjacent portions of the bottom surface of the case to effect autogenous closure by fusion, and to facilitate such autogenous closure I may employ a pin of relatively fusible glass in conjunction with a case made of a less fusible glass or a glass which only fuses at a relatively high temperature. Autogenous fusion forms an extremely satisfactory means of closing a core case of the general type herein described, and provides complete protection for the core material, giving a weight which is remarkably resistant to atmospheric agencies and laboratory fumes.

When employing bakelite or any equivalent synres in forming the case of a composite weight of the type herein described, I prefer to employ a pin made of the same material, and very slightly larger in diameter than the opening in the case, and I find that when such a pin is forcibly driven into the opening in the case by the use of suitable pressure, the closure which is effected is entirely complete and represents a completely air-tight or hermetic seal. For certain purposes, however, it is desirable to slightly moisten the pin with a small amount of a cementing agent, and particularly with a phenolic condensation product in its liquid and incompletely polymerized or hardened condition, the amount of such cementing agent that is used being the smallest amount that will form a perfect seal, in order to avoid changes in weight due to subsequent modification of the cementing agent in the hardening step, and subsequently hardening the cementing agent by heating or other suitable treatment.

I am aware that brass weights have been protected, long prior to my present invention, by the use of a thin layer or coating of a protecting varnish or lacquer, and it is not impossible that lacquers of a synres base have been thus employed for the purpose of protecting a brass weight from atmospheric corrosion. I do not claim as any part of my invention the use of a varnish or lacquer for protecting purposes upon a brass weight, as my invention is of a quite different nature, and involves the use of a molded or otherwise fabricated mass or case of a chemically inert material of low density, and representing in general more than 10% of the total volume of the finished weight, as compared with a fraction of 1% of the volume of the finished weight in cases where lacquers and varnishes have been employed in the past. In the case of the smaller weights of a set, by which is meant weights of such size that their use, for the particular accuracy required in the weighing operation, will not involve buoyancy error greater than the tolerance of the weight or the limit of accuracy necessary in the weighing operation, I may employ weights made wholly of a synres or equivalent chemically inert hard, tough solid of low specific gravity, and for all larger weights, of such size that their volume would introduce a serious buoyancy error, I may employ composite weights of the construction herein described and preferably comprising an inner metal core having a specific gravity of 9 or more and an outer casing having a specific gravity of 5 or less, the relative volumes of the core portion and the case portion being such that the specific gravity of the entire weight will involve no buoyancy error when used in connection with customary brass weights greater than the permitted tolerance of the individual weights.

It will be evident that many modifications may be made without departing from the essential principles of the disclosure as herein made, and accordingly no limitations should be placed upon my invention except as indicated in the appended claims.

I claim:

1. A weight having substantially the specific gravity of brass comprising an outer case of a chemically inert material of relatively low specific gravity and a core of a material of relatively high specific gravity.

2. A weight having substantially the specific gravity of brass comprising a case of a chemically inert material having a specific gravity of 5 or less and a core of a material having a specific gravity of 9 or more.

3. A weight having substantially the specific gravity of brass comprising a case of synres, and a core of a material having a specific gravity of 9 or more.

4. A weight having substantially the specific gravity of brass comprising a case of synres and a core of a heavy metal.

5. As a new article of manufacture, a balance weight composed superficially of a synres having a specific gravity of 5 or less and having an internal core having a specific gravity of 9 or more.

6. An autogenously sealed balance weight comprising a case of a chemically inert material of relatively low specific gravity and a core of a material of relatively high specific gravity.

In testimony whereof, I have hereunto subscribed my name this 25th day of October, 1928.

WALTER O. SNELLING.